United States Patent
Zhou (10) Patent No.: US 10,209,568 B2
(45) Date of Patent: Feb. 19, 2019

(54) DISPLAY PANEL AND DISPLAY DEVICE

(71) Applicant: Xiamen Tianma Micro-Electronics Co., Ltd., Xiamen (CN)

(72) Inventor: Hongbo Zhou, Xiamen (CN)

(73) Assignee: XIAMEN TIANMA MICRO-ELECTRONICS CO., LTD. (CN)

( * ) Notice: Subject to any disclaimer, the term of this patent is extended or adjusted under 35 U.S.C. 154(b) by 0 days.

(21) Appl. No.: 15/793,873

(22) Filed: Oct. 25, 2017

(65) Prior Publication Data
US 2018/0348554 A1  Dec. 6, 2018

(30) Foreign Application Priority Data
Jun. 6, 2017 (CN) .......................... 2017 1 0418078

(51) Int. Cl.
G02F 1/1333 (2006.01)
G02F 1/1337 (2006.01)
G02F 1/1362 (2006.01)
G06F 3/041 (2006.01)
G02F 1/1343 (2006.01)

(52) U.S. Cl.
CPC .......... *G02F 1/1337* (2013.01); *G02F 1/1343* (2013.01); *G02F 1/13338* (2013.01); *G02F 1/133345* (2013.01); *G02F 1/136227* (2013.01); *G06F 3/0412* (2013.01)

(58) Field of Classification Search
CPC ........................................ G02F 2001/134372
See application file for complete search history.

(56) References Cited

U.S. PATENT DOCUMENTS

2013/0172570 A1* 7/2013 Shi ....................... C07D 401/14
548/152
2016/0313614 A1* 10/2016 Woo .................. G02F 1/133345

* cited by examiner

*Primary Examiner* — Phu Vu
(74) *Attorney, Agent, or Firm* — Tarolli, Sundheim, Covell & Tummino LLP (57) ABSTRACT

A display panel and a display device, the display panel includes an array substrate; wherein the array substrate includes a common electrode, a first insulation layer, a plurality of pixel electrodes and an alignment layer; the common electrode, first insulation layer, plurality of pixel electrodes and alignment layer are successively arranged; at least one first through hole is defined in the first insulation layer, and the alignment layer contacts with the common electrode via the at least one first through hole. By arranging in such a manner, although a thin-film transistor stays in a turn-on state for an extremely short time, however, since the common electrode is always in a conductive state, so that the electrostatic charge remaining on the alignment layer can be conducted away by the common electrode, thereby reducing the electrostatic charge remaining on the alignment layer, and thus improving display quality of display panel.

20 Claims, 8 Drawing Sheets

DISPLAY PANEL AND DISPLAY DEVICE

CROSS-REFERENCE TO RELATED APPLICATIONS

The present application claims priority to Chinese Patent Application No. 201710418078.9, filed on Jun. 6, 2017, the content of which is incorporated herein by reference in its entirety.

TECHNICAL FIELD

The present disclosure relates to the field of display technologies and, particularly, relates to a display panel and a display device.

BACKGROUND

A display panel includes an alignment layer, a pixel electrode, an insulation layer and a common electrode. The alignment layer respectively contacts with the pixel electrode and the insulation layer. When a gate electrode drives circuit is working, charge will remain at the alignment layer, although the pixel electrode is a conductor, however, since a thin-film transistor stays in a turn-on state for an extremely short time, most of the charge remaining at the alignment layer cannot be conducted away via the pixel electrode, which results in image sticking of the display panel.

SUMMARY

The present disclosure provides a display panel and a display device, which can reduce electrostatic charge remaining on an alignment layer, thereby improving display quality of the display panel.

In a first aspect, the present disclosure provides a display panel, including: an array substrate; wherein the array substrate includes a common electrode, a first insulation layer, a plurality of pixel electrodes and an alignment layer; the common electrode, the first insulation layer, the plurality of pixel electrodes and the alignment layer are successively arranged; at least one first through hole is defined in the first insulation layer, and the alignment layer contacts with the common electrode via the at least one first through hole.

In another aspect, the present disclosure provides a display device, and the display device includes the above display panel.

The technical solution provided by the present disclosure can achieve the following beneficial effects:

The present disclosure provides a display panel, wherein a through hole is defined in the insulation layer, the common electrode contacts with the alignment layer via the first through hole. By arranging in such a manner, although a thin-film transistor stays in a turn-on state for an extremely short time, however, since the common electrode is always in a conductive state, so that the electrostatic charge remaining on the alignment layer can be conducted away by the common electrode, thereby reducing the electrostatic charge remaining on the alignment layer, and thus improving display quality of the display panel.

It should be understood that, both the above general description and the following detailed description are exemplary only, which will not limit the scope of the present disclosure.

REFERENCE SIGNS

1—array substrate;
  11—common electrode;
  12—first insulation layer;
    121—first through hole;
  13—pixel electrode;
    13'—conductive material;
    13"—conductive material;
    131—signal transmission end;
  15—first touch wiring;
    15'—dummy touch wiring;
  16—second insulation layer;
  17—planarization layer;
  18—alignment layer;
  19—second through hole;
2—thin—film transistor;
  21—drain electrode;
  22—gate electrode;
  23—source electrode;
3—color film substrate;
  31—black matrix;
4—display device.

The drawings herein are incorporated into and constitute a part of the present specification, which show exemplary embodiments in accordance with the present disclosure and explain principles of the present disclosure together with the description.

DESCRIPTION OF EMBODIMENTS

The present disclosure will be illustrated in detail with reference to embodiments and the accompanying drawings.

It should be noted that, the expressions such as "upper", "lower", "left", "right" and the like mentioned in embodiments of the present disclosure are described with reference to the placement status in the accompanying drawings, and should not be construed as limiting embodiments of the present disclosure. In addition, it should also be understood that, in the context, while referring to an element being formed "above" or "below" another element, it is possible that the element is directly formed "above" or "below" the other element, it is also possible that the element is formed "above" or "below" the other element via a middle element.

Figure 1:
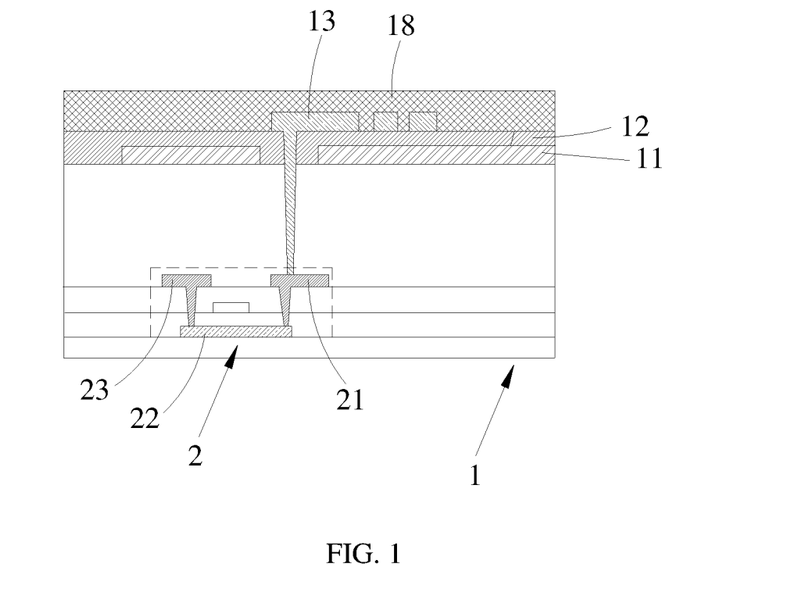
FIG. 1 illustrates a cross-sectional view of a partial structure of a display panel according to an embodiment of the present disclosure.

With reference to FIG. 1, which illustrates a cross-sectional view of a partial structure of a display panel according to an embodiment of the present disclosure. The display panel includes an array substrate 1 and a thin-film transistor 2. A common electrode 11, a first insulation layer 12, a plurality of pixel electrodes 13 and an alignment layer 18 are successively provided on the array substrate 1. Generally, the common electrode 11 and the pixel electrode 13 are transparent conductive films, the first insulation layer 12 is a polyvinyl chloride (Polyvinyl Chloride, PVC) layer, and the alignment layer is a polyimide (Polyimide, PI) layer.

Each pixel electrode 13 is connected with a drain electrode 21 of the thin-film transistor 2 via a through hole defined in the first insulation layer 12. The thin-film transistor 2 also includes a gate electrode 22 and a source electrode 23, the gate electrode 22 is connected with a scan line, and the source electrode 23 is connected with a data line, the pixel electrode 13 and the thin-film transistor 2 together constitute a pixel unit.

When the gate electrode drive circuit outputs a scan signal to the scan line, the scan signal makes the thin-film transistor 2 be turned on via the gate electrode 22, and the source electrode 23 is conducted with the drain electrode 21 for supplying power to the pixel electrode 13, at this time, a data signal provided by IC end can be input to the pixel electrode 13, which provides a potential to the pixel electrode 13, and the potential forms an electric field between the common electrode 11 and the pixel electrode 13.

Figure 2:
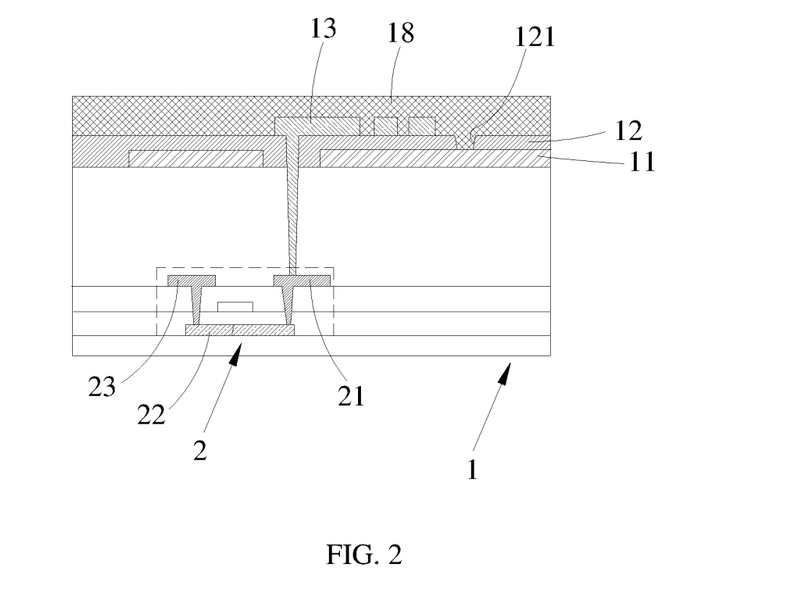
FIG. 2 illustrates a cross-sectional view of a display panel having a first through hole according to an embodiment of the present disclosure.

During displaying of the display panel, since the thin-film transistor 2 is in a turn-off state for most of the time, so that electrostatic charge remaining in the alignment layer 18 cannot be conducted away by the pixel electrode 13, resulting in an image sticking of the display panel. For this reason, with reference to FIG. 2, the present disclosure proposes that, at least one first through hole 121 is defined in the first insulation layer 12, and the alignment layer 18 contacts with the common electrode 11 via the first through hole 121, so that even though the thin-film transistor 2 is in a turn-off state for most of the time, however, since the common electrode 11 is always in a turn-on state, that is, in a display stage, the common electrode 11 receives a signal from a common end, and during a touch stage, the common electrode 11 receives a touch signal, thus the electrostatic charge remaining in the alignment layer 18 can be conducted away by the common electrode 11, which reduces remaining electrostatic charge in the alignment layer 18, thereby improving display quality of the display panel.

Figure 3:
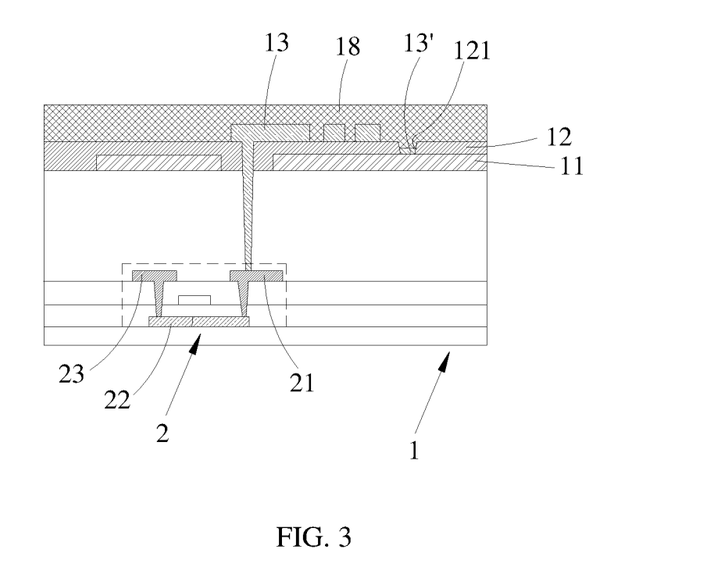
FIG. 3 illustrates a cross-sectional view of an alignment layer contacting with a common electrode according to an embodiment of the present disclosure.

The alignment layer 18 contacts with the common electrode 11 via the first through hole 121, a specific contact manner can be that, with reference to FIG. 3, conductive material 13' and the pixel electrode 13 are arranged in a same layer, and the conductive material 13' is provided in the first through hole 121, the alignment layer 18 is electrically connected with the common electrode 11 via the conductive material 13'. It is known that, during processing of a display panel, a transparent conductive film is usually adhered to a substrate in a deposition manner so as to form the pixel electrode 13 or the common electrode 11. In this solution, the conductive material 13' and the pixel electrode 13 are arranged in the same layer, so that the conductive material 13' and the pixel electrode 13 can be formed in a same film layer, and the conductive material 13' is deposited in the first through hole 121, at this time, the conductive material 13' does not need to be processed separately, thereby saving processing steps of the display panel, and simplifying processing technique of the display panel.

Figure 4:
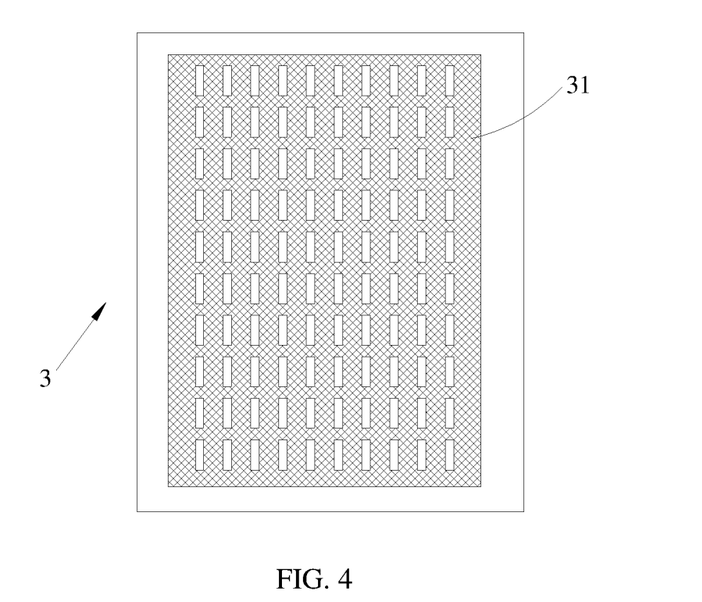
FIG. 4 illustrates a schematic diagram of a color film substrate according to an embodiment of the present disclosure.

While defining the first through hole 121, it is necessary to take into account a position of the first through hole 121. In particular, as for a liquid crystal display panel, the position of the first through hole 121 will directly influence the aperture ratio of the display panel. For this reason, in an embodiment, with reference to FIG. 4, the first through hole 121 may be provided in an area of the first insulation layer 12 covered by a black matrix 31 of a color film substrate 3, in other words, an orthogonal projection of the black matrix 31 of the color film substrate 3 on array substrate 1 covers an orthogonal projection of the first through hole 121 on the array substrate 1. In this manner, the setting of the first through hole 121 can effectively conduct away the remaining charge at the alignment layer 18, and the aperture ratio of the display panel is not reduced.

Figure 5:
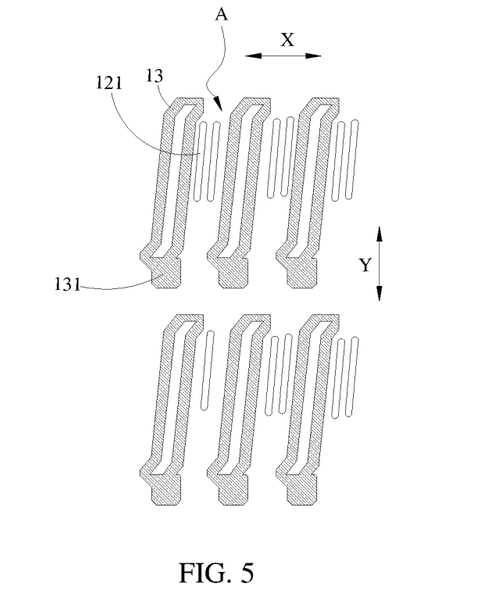
FIG. 5 illustrates a schematic diagram of a first through hole being defined at a first position according to an embodiment of the present disclosure.

There are a plurality of options for the position of the first through hole 121 defined in the first insulation layer 12, in an exemplary embodiment, with reference to FIG. 5, which illustrates a schematic diagram of a first through hole being defined at a first position according to an embodiment of the present disclosure.

A plurality of pixel electrodes 13 is arranged in parallel in a first direction (i.e., X direction in FIG. 4), and the first direction is a row direction of distribution of the pixel electrodes 13. One end of each pixel electrode 13 connected with the drain electrode 21 of each thin-film transistor 2 is a signal transmission end 131 of the pixel electrode 13. At least one first through hole 121 can be provided in an area between two adjacent pixel electrodes 13 away from the signal transmission end 131 of the pixel electrode 13, for simplicity, this area is marked as a first area A. With this arrangement, on the one hand, the first area A is an area covered by the black matrix, the aperture ratio of the display panel will not be reduced; on the other hand, the first through hole 121 is provided at a position away from the signal transmission end 131, which can reduce parasitic capacitance between the conductive material 13' and the gate electrode 22, the source electrode 23, or the drain electrode 21 of the thin-film transistor.

It should be noted that, the "at least one first through hole 121 can be provided in an area between two adjacent pixel electrodes 13 away from the signal transmission end 131 of the pixel electrode 13" herein means that, in an area between two adjacent pixel electrodes 13 away from the signal transmission end 131 of the pixel electrode 13, one or more first through hole 121 can be provided, or some first through holes 121 may also be provided at other positions, but not all first through holes 121 are provided in the first area A.

Figure 6:
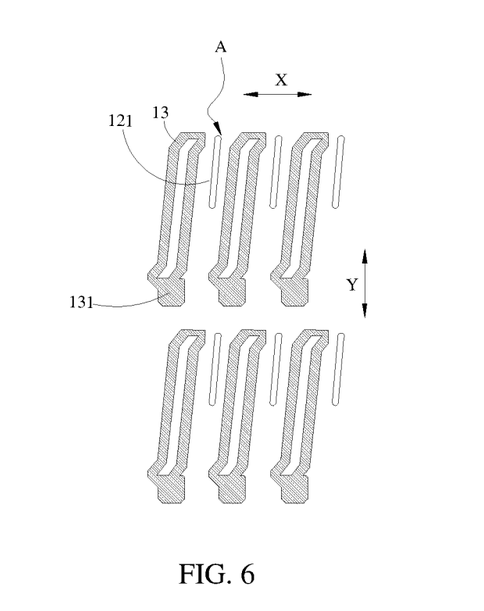
FIG. 6 illustrates a schematic diagram of a first through hole being defined at a first position according to a first embodiment of the present disclosure.

Optionally, with reference to FIG. 6, only one first through hole 121 is provided in the first area A between two adjacent pixel electrodes 13, and the first through hole 121 is provided at a middle position of the first area A along the first direction.

Figure 7:
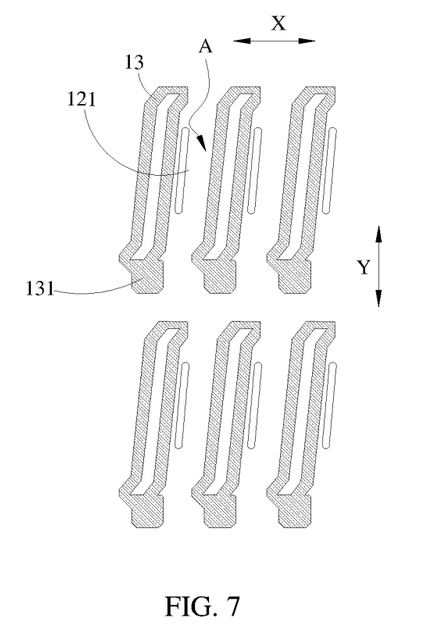
FIG. 7 illustrates a schematic diagram of a first through hole being defined at a first position according to a second embodiment of the present disclosure.

Optionally, with reference to FIG. 7, it is also possible that only one first through hole 121 is provided in the first area A between two adjacent pixel electrodes 13, and the first through hole 121 is provided at a middle position of the first area A along a second direction (i.e., Y direction in FIG. 7). The second direction is a column direction of distribution of the pixel electrodes 13, and in the embodiment shown in FIG. 7, the second direction is substantially perpendicular to the first direction. Obviously, in other embodiments, the first direction and the second direction may also form an included angle other than 0° and 90°.

Figure 8:
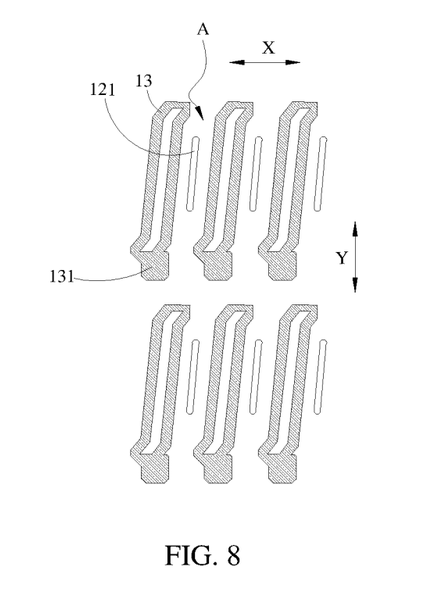
FIG. 8 illustrates a schematic diagram of a first through hole being defined at a first position according to a third embodiment of the present disclosure.

Optionally, with reference to FIG. 8, it is also possible that only one first through hole 121 is provided in the first area A between two adjacent pixel electrodes 13, and the first through hole 121 is provided at a middle position of the first area A along both the first direction and the second direction.

In embodiments shown in FIGS. 6-8, on the one hand, the first area A directly faces the area covered by the black matrix 31 on the color film substrate 3, so that providing the first through hole 121 at this position can avoid reducing the aperture ratio of the display panel; on the other hand, providing the first through hole 121 at a middle position along the first direction, or a middle position along the second direction, or a middle position along both the first direction and the second direction can prevent the first through hole 121 from interfering with the pixel electrode 13 in a thickness direction of the display panel, thereby avoiding the problem that the alignment layer 18 cannot sufficiently contact with the common electrode 11 caused by the first through hole 121 being too close to the pixel electrode 13.

In each embodiment shown in FIGS. 5-8, each pixel electrode 13 is formed as a strip-like structure, and the first area A between two adjacent pixel electrodes 13 is a strip-like area and, accordingly, the first through hole 121 can be formed as a strip-like hole, and a length direction of the first through hole 121 is in accordance with a length direction of the pixel electrode 13. With this arrangement, a size of the first through hole 121 in the length direction can be appropriately increased, so that a contact area between the alignment layer 18 and the common electrode 11 can be increased, and thus the remaining electrostatic charge at the alignment layer 18 can be quickly and smoothly conducted away.

Figure 9:
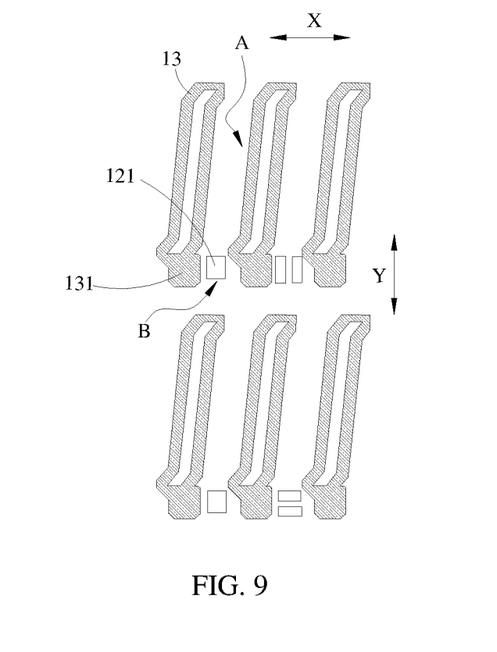
FIG. 9 illustrates a schematic diagram of a first through hole being defined at a second position according to an embodiment of the present disclosure.

With reference to FIG. 9, illustrates a schematic diagram of a first through hole being defined at a second position. One end of the pixel electrode 13 connected with the drain electrode 21 of the thin-film transistor 2 is the signal transmission end 131 of the pixel electrode 13, at least one first through hole 121 is provided in an area between two adjacent signal transmission ends 131, this area is marked as a second area B. Although a position of the first through hole 121 in this embodiment is different from that of the first through hole 121 in the above-described embodiment, however, all first through holes 121 at different positions can effectively conduct away the electrostatic charge at the alignment layer 18, thereby improving display quality of the display panel.

In the similar way, the "at least one first through hole 121 is provided in an area between two adjacent signal transmission ends 131" means that, in an area between two adjacent signal transmission ends 131, one or more first through hole 121 can be provided, or some first through holes 121 may also be provided at other positions, but not all first through holes 121 are provided in the second area B.

Figure 10:
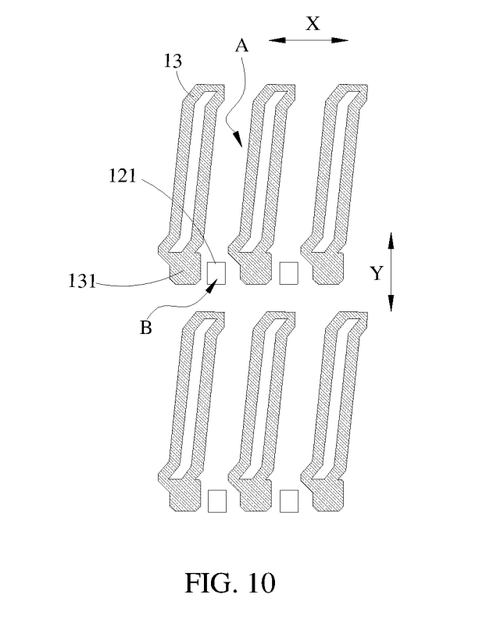
FIG. 10 illustrates a schematic diagram of a first through hole being defined at a second position according to a first embodiment of the present disclosure.

Optionally, with reference to FIG. 10, only one first through hole 121 is provided in the second area B between two adjacent signal transmission ends 131, and the first through hole 121 is provided at a middle position of the second area B along a first direction (i.e., X direction in FIG. 10).

Figure 11:
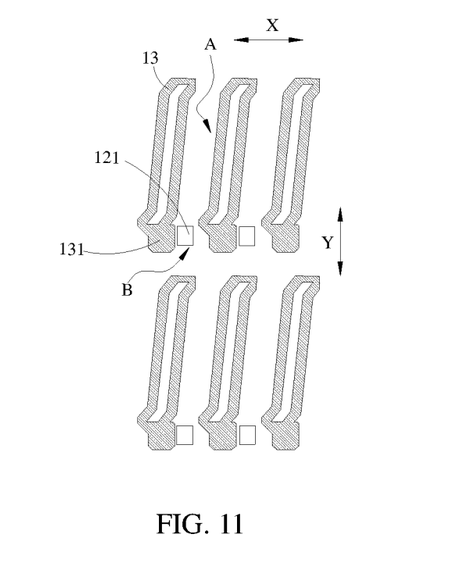
FIG. 11 illustrates a schematic diagram of a first through hole being defined at a second position according to a second embodiment of the present disclosure.

Optionally, with reference to FIG. 11, only one first through hole 121 is provided in the second area B between two adjacent signal transmission ends 131, and the first through hole 121 is provided at a middle position of the second area B along a second direction (i.e., Y direction in FIG. 11). The second direction is a column direction of distribution of pixel electrodes 13, and in an embodiment shown in FIG. 11, the second direction is substantially perpendicular to the first direction. Obviously, in some other embodiments, the first direction and the second direction may also form an included angle other than 0° and 90°.

Figure 12:
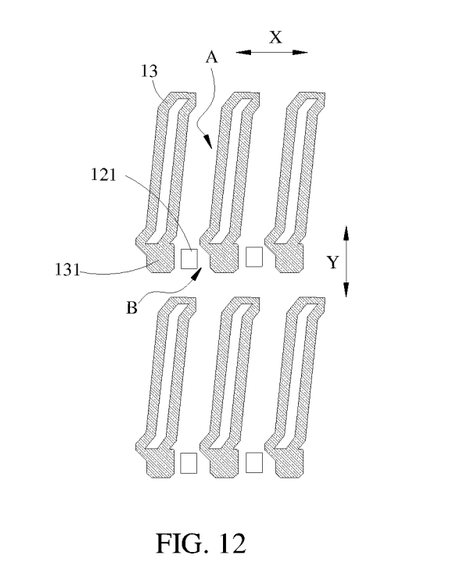
FIG. 12 illustrates a schematic diagram of a first through hole being defined at a second position according to a third embodiment of the present disclosure.

Optionally, with reference to FIG. 12, only one first through hole 121 is provided in the second area B between two adjacent signal transmission ends 131, and the first through hole 121 is provided at a middle position of the second area B along both the first direction and the second direction.

In embodiments shown in FIGS. 10-12, on the one hand, the second area B directly faces the area covered by the black matrix 31 on the color film substrate 3, so that providing the first through hole 121 at this position can avoid reducing the aperture ratio of the display panel; on the other hand, providing the first through hole 121 at a middle position along the first direction, or along the second direction, or along both the first direction and the second direction can prevent the first through hole 121 from interfering with the pixel electrode 13 in thickness direction of the display panel, thereby avoiding the problem that the alignment layer 18 cannot sufficiently contact with the common electrode 11 caused by the first through hole 121 being too close to the pixel electrode 13.

In each embodiment shown in FIGS. 9-12, the second area B is substantially a square area and, accordingly, the first through hole 121 can be formed as a square hole, so that an opening area of the first through hole 121 can be increased, and thus a contact area between the alignment layer 18 and the common electrode 11 can be increased, so that the remaining electrostatic charge at the alignment layer 18 can be quickly and smoothly conducted away.

In each embodiment shown in FIGS. 6-8 and shown in FIGS. 10-12, since the middle positions of the first area A and the second area B directly face an area where the common electrode 11 is located, when the first through hole 121 is defined in the first insulation layer 12, the common electrode 11 can be easily exposed via the first through hole 121, so that a deficiency that the common electrode 11 cannot be contacted with due to the position of the first through hole 121 being too close to the pixel electrode 13 will be avoided.

In each embodiment shown in FIGS. 5-12, it is possible that a first through hole 121 is provided respectively in each first area A and each second area B, in this case, a plurality of first through holes 121 may be formed in the first insulation layer 12 and, accordingly, the alignment layer 18 may be electrically connected with the common electrode 11 via a plurality of first through holes 121. In such a way, by increasing the number of first through hole 121, the alignment layer 18 has a plurality of positions where the alignment layer 18 can contact with the common electrode 11, so that a plurality of conductive paths can be added, thereby further reducing the remaining electrostatic charge at the alignment layer 18, which allows the display effect to be more uniform, and no diagonal phenomenon will appear on the display panel.

Although the position of the first through hole 121 is specifically described above, however, the position of the first through hole 121 is not limited to the above description. For example, in some other embodiments, it may also be possible to combine the embodiments with different arrangement of the first through hole 121, so as to obtain a further embodiment in which the position of the first through hole 121 is provided differently. Besides, the first through hole 121 is not limited to the strip-like hole, and it is also possible that the first through hole 121 is a circular hole, an oval hole, a polygonal hole or the like.

Figure 13:
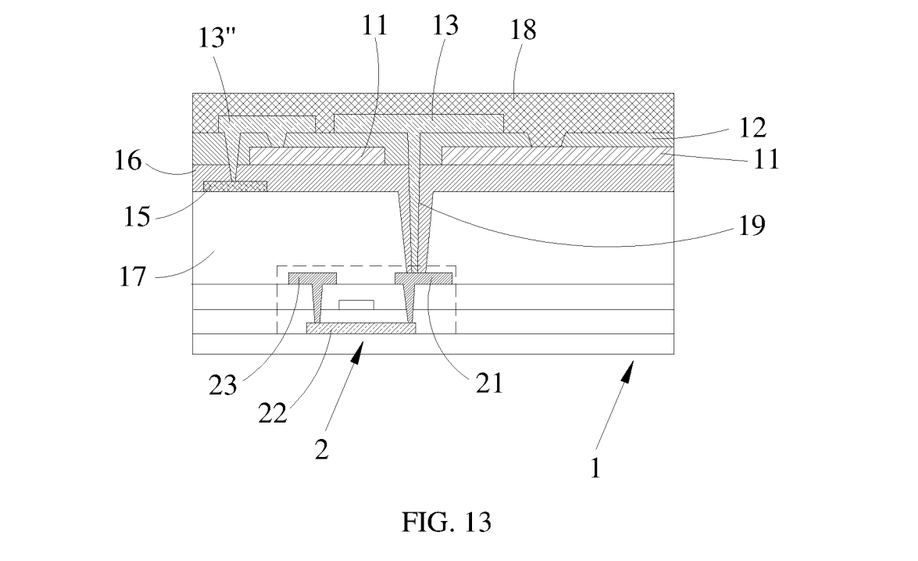
FIG. 13 illustrates a cross-sectional view of a display panel having a first touch wiring according to an embodiment of the present disclosure.

With reference to FIG. 13, the display panel provided by the present disclosure further includes at least one first touch wiring 15, a conductive material 13", which is arranged in a same layer with the pixel electrode 13, is respectively connected with the common electrode 11 and the first touch wiring 15, so as to transmit the touch signal, and in the touch stage, the common electrode 11 is also used as the touch electrode.

One touch electrode can be connected with one or more first touch wiring 15, the touch signal transmitted by each first touch wiring 15 is directed to only one corresponding touch electrode. When a user touches the display panel, the first touch wiring 15 transmits the touch signal, and a touch chip can detect the touch position according to changes of the electrical signal. Generally, each touch electrode is provided with a through hole, and each first touch wiring 15 is connected with its corresponding touch electrode respectively via this through hole. The above-described arrangement makes the display panel be integrated with touch function, so as to form an in-cell (an integration of touch panel and liquid crystal panel) display panel, so that the display panel is more convenient, flexible and diversified while receiving commands form users.

Optionally, the display panel further includes a second insulation layer 16, a first touch wiring 15, and a planarization layer 17 arranged successively. The common electrode 11 is insulated from first touch wiring 15 via the second insulation layer 16. The conductive material 13", which is arranged in the same layer with the pixel electrode 13, is respectively connected with the common electrode 11 (in this case the common electrode 11 is also used as the touch electrode) and the first touch wiring 15 in a bridging connection manner, so as to achieve the touch function.

In addition, in the embodiment as shown in FIG. 13, all of the first insulation layer 12, the second insulation layer 16 and the planarization layer 17 are provided with a second through hole 19 arranged coaxially, the pixel electrode 13 is connected with the drain electrode 21 of the thin-film transistor 2 via the second through hole 19.

Figure 14:
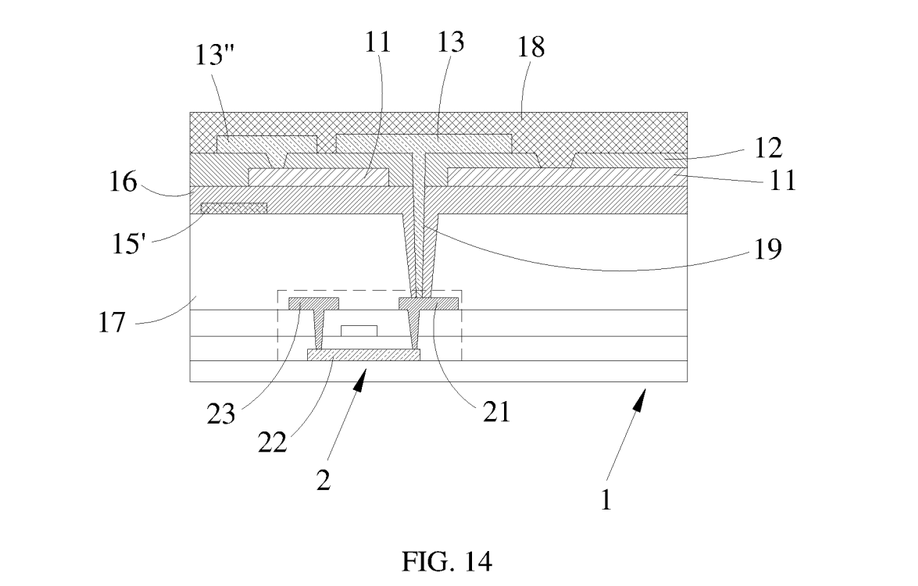
FIG. 14 illustrates a cross-sectional view of a display panel having a dummy touch wiring according to an embodiment of the present disclosure.

Furthermore, with reference to FIG. 14, the display panel further includes at least one dummy touch wiring 15'. The dummy touch wiring 15' and the first touch wiring 15 are provided in a same layer, however, the dummy touch wiring 15' is not used to transmit touch signal, that is, the dummy touch wiring 15' is not connected with the common electrode 11 but is insulated from the common electrode 11. In this solution, by providing the dummy touch wiring 15', it is possible that the through hole on the first insulation layer 12 for making the conductive material 13' contacting with the dummy touch wiring 15' is omitted, and only the through hole where the conductive material 13" contacts with the common electrode 11 (in this case the touch electrode) is kept, at this time, the electrostatic charge at the alignment layer 18 can also be conducted away by the touch electrode contacting with the conductive material 13".

Figure 15:
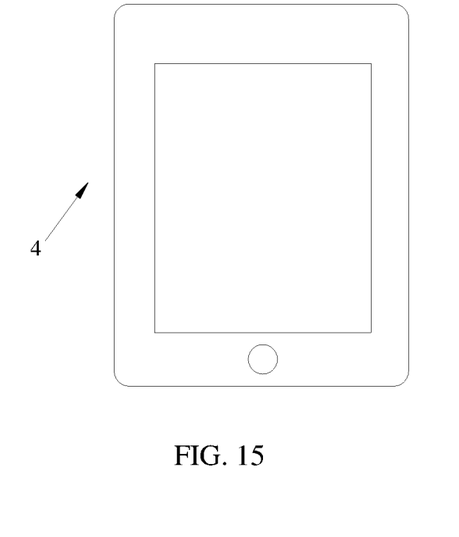
FIG. 15 illustrates a schematic diagram of a display device according to an embodiment of the present disclosure.

With reference to FIG. 15, a second aspect of the present disclosure provides a display device 4, and the display device 4 includes the display panel in any of the above embodiments.

The above are merely preferred embodiments of the present disclosure, which are not used to limit the present disclosure. All the modifications, equivalent substitutions and improvements made within the spirit and principles of the present disclosure shall fall into the protection scope of the present disclosure.

What is claimed is:

1. A display panel, comprising:
an array substrate;
wherein the array substrate comprises a common electrode, a first insulation layer, a plurality of pixel electrodes and an alignment layer; the common electrode, the first insulation layer, the plurality of pixel electrodes and the alignment layer are successively arranged;
at least one first through hole is defined in the first insulation layer, and the alignment layer contacts with the common electrode via the at least one first through hole,
wherein the display panel further comprises:
a thin-film transistor;
wherein an end of each of the pixel electrodes is connected with a drain electrode of the thin-film transistor, and the end of each of the pixel electrodes connected with the drain electrode of the thin-film transistor is a signal transmission end of each of the pixel electrodes,
one or more of the at least one first through hole is provided in an area between adjacent two of the pixel electrodes away from the signal transmission ends of the adjacent two of the pixel electrodes.

2. The display panel according to claim 1, wherein a conductive material is provided in the at least one first through hole, the conductive material and the plurality of pixel electrodes are arranged in a same layer, and the conductive material is electrically connected with the alignment layer and the common electrode, respectively.

3. The display panel according to claim 1, further comprising:
a color film substrate, the color film substrate comprising a black matrix;
wherein the color film substrate is placed at a side of the alignment layer away from the array substrate, and an orthogonal projection of the black matrix on the array substrate covers an orthogonal projection of the at least one first through hole on the array substrate.

4. The display panel according to claim 1, wherein the at least one first through hole is defined in an area of the first insulation layer between any adjacent two of the pixel electrodes, the alignment layer contacts with the common electrode via each of the at least one first through hole.

5. The display panel according to claim 1, wherein the one or more of the at least one first through hole is provided at a middle position of the area along a first direction, and the first direction is a row direction of distribution of the pixel electrodes.

6. The display panel according to claim 1, wherein the one or more of the at least one first through hole is provided at a middle position of the area along a second direction, and the second direction is a column direction of distribution of the pixel electrodes.

7. The display panel according to claim 1, wherein at least one first through hole is provided at a middle position of the area along both a first direction and a second direction,
the first direction is a row direction of distribution of the pixel electrodes, and the second direction is a column direction of distribution of the pixel electrodes.

8. The display panel according to claim 1, wherein the at least one first through hole is strip-like hole, and the pixel electrodes are strip-like electrodes, a length direction of the at least one first through hole is in accordance with a length direction of the pixel electrodes.

9. A display panel, comprising:
an array substrate;
wherein the array substrate comprises a common electrode, a first insulation layer, a plurality of pixel electrodes and an alignment layer; the common electrode, the first insulation layer, the plurality of pixel electrodes and the alignment layer are successively arranged;
at least one first through hole is defined in the first insulation layer, and the alignment layer contacts with the common electrode via the at least one first through hole,
wherein the display panel further comprises:
a plurality of thin-film transistors;
wherein an end of each of the pixel electrodes is connected with a drain electrode of one of the thin-film transistors, and the end of each of the pixel electrodes connected with the drain electrode of one of the thin-film transistors is a signal transmission end of each of the pixel electrodes;
one or more of the at least one first through hole is provided in an area between two adjacent signal transmission ends.

10. The display panel according to claim 9, wherein the one or more of the at least one first through hole is provided at a middle position of the area along a first direction, and the first direction is a row direction of distribution of the pixel electrodes.

11. The display panel according to claim 9, wherein the one or more of the at least one first through hole is provided at a middle position of the area along a second direction, and the second direction is a column direction of distribution of the pixel electrodes.

12. The display panel according to claim 9, wherein the one or more of the at least one first through hole is provided at a middle position of the area along both a first direction and a second direction,
the first direction is a row direction of distribution of the pixel electrodes, and the second direction is a column direction of distribution of the pixel electrodes.

13. The display panel according to claim 9, wherein the at least one first through hole is square-shaped.

14. The display panel according to claim 1, further comprising:
at least one first touch wiring;
wherein a conductive material and the plurality of pixel electrodes are arranged in a same layer, and the conductive material is electrically connected with the common electrode and the at least one first touch wiring, respectively;
during a touch stage, the common electrode is also used as a touch electrode.

15. The display panel according to claim 14, further comprising:
at least one dummy touch wiring insulated from the common electrode.

16. The display panel according to claim 9, wherein a conductive material is provided in the at least one first through hole, the conductive material and the plurality of pixel electrodes are arranged in a same layer, and the conductive material is electrically connected with the alignment layer and the common electrode, respectively.

17. The display panel according to claim 9, further comprising:
a color film substrate, the color film substrate comprising a black matrix;
wherein the color film substrate is placed at a side of the alignment layer away from the array substrate, and an orthogonal projection of the black matrix on the array substrate covers an orthogonal projection of the at least one first through hole on the array substrate.

18. The display panel according to claim 9, wherein the at least one first through hole is defined in an area of the first insulation layer between any adjacent two of the pixel electrodes, the alignment layer contacts with the common electrode via each of the at least one first through hole.

19. The display panel according to claim 9, further comprising:
at least one first touch wiring;
wherein a conductive material and the plurality of pixel electrodes are arranged in a same layer, and the conductive material is electrically connected with the common electrode and the at least one first touch wiring, respectively;
during a touch stage, the common electrode is also used as a touch electrode.

20. The display panel according to claim 19, further comprising:
at least one dummy touch wiring insulated from the common electrode.

* * * * *